(12) United States Patent
Goldenberg et al.

(10) Patent No.: US 6,327,083 B1
(45) Date of Patent: Dec. 4, 2001

(54) REAR PROJECTION SCREEN WITH REDUCED SPECKLE

(75) Inventors: Jill F. Goldenberg, New Rochelle; Qiang Huang, Cortlandt Manor, both of NY (US); Johannes C. Van De Ven, Eersel (NL)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/685,552

(22) Filed: Oct. 10, 2000

Related U.S. Application Data

(60) Continuation of application No. 08/914,586, filed on Aug. 18, 1997, now Pat. No. 6,147,801, which is a division of application No. 08/418,231, filed on Apr. 6, 1995, now Pat. No. 5,760,955.

(51) Int. Cl.[7] ............................. G03B 21/56; G03B 21/60

(52) U.S. Cl. ............................................. 359/453; 359/460
(58) Field of Search .............................. 359/15, 443, 452, 359/453, 454, 455–457, 460

(56) References Cited

U.S. PATENT DOCUMENTS

| | | | | |
|---|---|---|---|---|
| 4,586,781 | * | 5/1986 | Gunther | 359/15 |
| 5,005,945 | * | 4/1991 | Van De Ven | 350/128 |
| 5,760,955 | * | 6/1998 | Goldenberg et al. | 359/456 |
| 5,999,281 | * | 12/1999 | Abbott et al. | 359/15 |

* cited by examiner

Primary Examiner—Christopher E. Mahoney
(74) Attorney, Agent, or Firm—Dicran Halajian

(57) ABSTRACT

A rear projection screen which includes a front lenticular surface, a diffusion region behind the lenticular surface, a non-diffusion region behind the diffusion region, and a rear phase grating surface, when used with high magnification projection systems, exhibits reduced speckle when compared to other rear projection screen without such a grating.

23 Claims, 12 Drawing Sheets

REAR PROJECTION SCREEN WITH REDUCED SPECKLE

CROSS REFERENCE TO RELATED APPLICATIONS

This is a continuation of application Ser. No. 08/914,586, filed Aug. 18, 1997, now U.S. Pat. No. 6,147,801, which is a divisional of application Ser. No. 08/418,231, filed Apr. 6, 1995, now U.S. Pat. No. 5,760,955.

This invention was made with United States Government support under Award 70NANB5H1070, entitled "High Information Content Display Technology", awarded by the Department of Commerce through its National Institute of Science & Technology (NIST).

BACKGROUND OF THE INVENTION

This invention relates to rear projection screens, and more particularly relates to such screens for use projectors in which the projection beam is nearly coherent.

Rear projection screens transmit to an audience space an image projected onto the rear of the screen. The performance of rear projection screens is characterized by their gain (defined as the luminance of the screen in the forward going direction with respect to the luminance from an ideal lambertian reflector), their viewing space, resolution, contrast and artifacts. An ideal rear projection screen would provide a clear crisp, high contrast, bright image for a large audience space. That is, the screen would have 1) high resolution, 2) freedom from artifacts, 3) contrast enhancement, 4) high gain and 5) spreading of the light from the projector into a large range of vertical and horizontal angles.

In reality, a screen that exhibits all these characteristics does not exist. For instance, to increase screen gain, the screen designer must limit the audience space. Typically, viewers of rear projection displays are scattered over a large range of horizontal angles (i.e. sitting anywhere in a room) but they all fall within a limited range of vertical angles (no one is near the ceiling or directly below the screen). Therefore to increase the brightness of the system, screen gain can be increased by limiting the vertical distribution of the light from ±90 degrees to typically ±8 degrees. By 'squeezing' the light into this limited audience space, the gain of the screen can be made to be as high as 6.0.

High resolution requires very small structures in the screen. High contrast requires a mechanism to reduce the amount of ambient room light that is reflected from the screen. Typically, either a black dye is added to the screen or black stripes are added to the front surface of the screen to reduce reflections of ambient light. With black dye, the contrast is increased but the gain is reduced (light from the projector is absorbed along with the ambient light). With black stripes, the resolution is limited by the pitch of the stripes.

Therefore different screen design concepts must be used to design the optimal screen for a specific application.

The commercial market for rear projection screens can be divided into two main categories; screens for consumer rear projection TVs (PTV), and screens for specialty applications.

Almost all PTVs use double lenticular, high contrast, high gain screens. FIG. 1 shows in a longitudinal cross section a typical double lenticular screen, described for example in U.S. Pat. No. 5,066,099. The screen is made of two pieces. The rear piece is a Fresnel lens 10 which is generally designed to image the exit pupil of the projector to the viewing plane. This allows a viewer sitting on axis to see the entire image. The front piece 12 has front 14 and rear 16 vertically oriented lenticular surfaces (one with black stripes 18) with bulk diffusion between the two surfaces. A bulk diffuser is defined as minute colloidal particles 19 suspended throughout the screen. The particles (typically less than about 40 microns in size) have a slightly different refractive index than that of the screen. The bulk diffuser is designed to provide the desired vertical distribution of the image into the audience space, typically ±8 degrees.

The rear lenticular surface 16 focuses the light coming from the Fresnel lens into stripes at the plane of the front surface 14. The lenticules 14a of the front lenticular surface are aligned to these stripes of light and spread the light into a wide range of horizontal angles. In between these stripes, where the screen is not optically active, stripes 18 of black paint are applied. The black stripes do not effect the light coming out of the projector but do absorb about 50% of the ambient room light that hits the screen's front surface.

For this type of screen, there is a direct relationship between the pitch of the lenticular surfaces and the thickness of the screen. A minimum thickness is required to assure mechanical durability. This limits the minimum pitch (distance between the lenticules) to about 0.5 mm, which in turn limits the ultimate resolution of the screen.

Other screens are made for niche markets. Diffusing screens (rotationally symmetric bulk or surface diffusers) which have low gain (less than 2.0) and no contrast enhancement or dyes are used in high resolution systems such as microfilm/microfiche readers.

Non blackened lenticular screens (see FIG. 2) are typically one-piece. The Fresnel lens 20 is on the back surface and a lenticular surface 22 is on the front. There are diffusing particles 19 throughout the bulk. The combination of the bulk diffuser and lenticules provide a high aspect ratio viewing space and high gain. Since there is no relationship between the thickness of the screen and the pitch of the lenticules, resolution is limited only by the ability to manufacture the individual lenticular elements. The Fresnel can be put on the back surface when the distance from the exit pupil to the screen is at least 1.33 times larger than the diameter of the screen. Otherwise, a separate piece is needed for the Fresnel lens. Bradley et al, IEEE Trans. on Consumer Electronics; v. 31; (3); pp. 185–193; August 1985.

FIG. 3 shows a rear projection screen of a type called a TIR screen. Such a screen is described in U.S. Pat. No. 4,730,897, assigned to the present assignee, the entire contents of which are incorporated herein by reference. These screens use bulk diffusion, sometimes confined to a region 38 adjacent the lenticules, for vertical distribution and a single front surface 30 for the horizontal distribution. The shape of the lenticules 30a incorporates steep sidewalls 32 which totally internally reflect (TIRs) the light to the tip region 34 of the lenticules. The area in between the lenticules can be filled with a blackened substance 36 in a manner to maintain reflectivity of the steep sidewall surfaces, to thereby provide high contrast. This screen can have the Fresnel 39 on the back surface or on a second piece. This screen has similar characteristics to the double lenticular screen, i.e., high contrast and high gain, but the resolution can be increased because there is no relationship between screen thickness and resolution. Screens with 0.2 mm pitch have been made.

Rear projection screens typically contain some mechanism such as minute colloidal particles to diffuse the light into the desired viewing space. When these screens are used with high magnification systems in which the projection beam is nearly coherent, a disturbing artifact in the form of a speckle pattern is often observed. This speckle pattern is most pronounced in screens with high gain.

Speckle has also been observed in microfiche and microfilm readers where the f/# of the beam and the magnification is high.

Speckle is most often associated with laser illumination. See for example, D. Gabor, IBM J. Res. Develop., September 1970, pp 509–514. It appears when random surfaces are illuminated with nearly coherent beams.

Speckle reduction has been discussed in the literature. It is well known that to reduce the visibility of speckle, the coherence of the illumination beam must be destroyed. This has been achieved by moving one diffusing screen with respect to another and separating the diffusing surfaces. S. Lowenthal et al., J. Opt. Soc. Am., pp. 847–851 (1971) ; N. George et al., Opt. Commun., pp. 71–71 (1975); E. G. Rawson et al., J. Opt. Soc. Am., pp. 1290–1294 (1976) and L. G. Shirley et al., J. Opt. Soc. Am. A, pp 765–781 (1989).

We have observed that increasing the amount of diffusion and increasing the thickness of the diffuser also can reduce the visibility of the speckle, but on the other hand deteriorates the resolution o f the screen.

OBJECTS AND SUMMARY OF THE INVENTION

Accordingly, it is a principal object of the invention to reduce the speckle pattern in rear projection screens.

It is another object of the invention to reduce the speckle pattern in rear projection screens, while maintaining the resolution, viewing space and gain of the screen.

It is another object of the invention to reduce the speckle pattern in a rear but of the type having a front lenticular surface for spreading light horizontally into an audience space.

It is another object of the invention to modify the existing TIR-type rear projection screens to reduce the speckle pattern without destroying the resolution or significantly changing the viewing space or gain of the screen.

In the case of rear projection light valve systems, the light from the projection lens subtends a very small angle at the screen. In accordance with our invention, we have recognized that the bulk diffusing particles diffract this light, creating speckle. For example, for an f/3 projection lens, 52 inch screen, and 1.3 inch liquid crystal light valve, the angular extent of the projected beam is only about ±0.32 degrees. This small angle results in a large spatial coherence length at the screen. Light diffracting from particles within the coherence length will interfere coherently, resulting in speckle. We can calculate the coherence length by using the equation $$\rho = 0.612 \lambda / \sin(\alpha) \quad \text{(Eq.1)}$$

where $\rho$ is the coherence length, $\lambda$ is the wavelength of light and $\alpha$ is the angular extent of the beam. For $\lambda=0.55$ microns, $\rho=72$ microns. Typically, the bulk diffusing particles in the screens are less than about 40 microns in size. Since several of these particles will fall within the coherence length, a speckle pattern will appear at the screen.

By contrast, for a CRT system using 5 inch tubes, the coherence length at the screen is only 7 microns. Therefore, the light diffracting from one particle is totally incoherent with respect to the light diffracting from the next particle. As a result, there is no interference and no speckle.

Further in accordance with the invention, we have recognized that the speckle in rear projection screens of the type having a front lenticular surface can be substantially reduced by incorporating a diffraction grating into the rear surface of the screen.

Accordingly, a rear projection screen of the invention comprises; a front surface, means for diffusing the projected light into an audience space, a rear phase grating surface, and a non-diffusing region separating the diffusion means and the phase grating.

Such diffusion means may comprise bulk diffusion, surface diffusion, or holographic diffusion, or a combination of two or more of these means.

According to a preferred embodiment of the invention, the front surface of the screen is defined by an array of mutually parallel lenticules for spreading projected light horizontally into the audience space, for example, a TIR lenticular surface in which the lenticules have steep sidewalls for total internal reflection (TIR).

According to another preferred embodiment of the invention, the diffusion means comprises a bulk diffusion region between the non-diffusing region and the lenticular surface and/or within the lenticular surface. Alternatively, such diffusion means comprises a roughening of the front lenticular surface. The phase grating is defined by a regular array of grating elements having a fixed pitch of from about 15 to 60 microns, where the pitch is the distance between the centers of adjacent phase grating elements. Such an array may be two-dimensional, e.g., an x-y matrix, but for manufacturability is preferably one-dimensional, e.g., a linear grating of mutually parallel elements. Preferably, the elements of the phase grating have a curved cross-section, for example, spherical or cylindrical, and have a radius of curvature of from about 50 to 300 microns. Below a pitch of about 15 microns and/or a radius of about 50 microns, the angular spread of the light caused by the grating becomes excessive, resulting in reduced gain and resolution; above a pitch of about 60 microns and/or a radius of about 300 microns, resolution is reduced, and the grating becomes less effective as a speckle reducer.

A Fresnel lens is embodied in a separate piece which is located behind the phase grating.

Use of such a diffraction grating to modify the existing TIR-type rear projection screens significantly reduces the speckle pattern without destroying the resolution or significantly changing the viewing space or gain of the screen.

In accordance with another embodiment of the invention, the diffraction grating is replaced by diffusion means, either surface or bulk diffusion.

DESCRIPTION OF THE PREFERRED EMBODIMENTS

Figure 4:
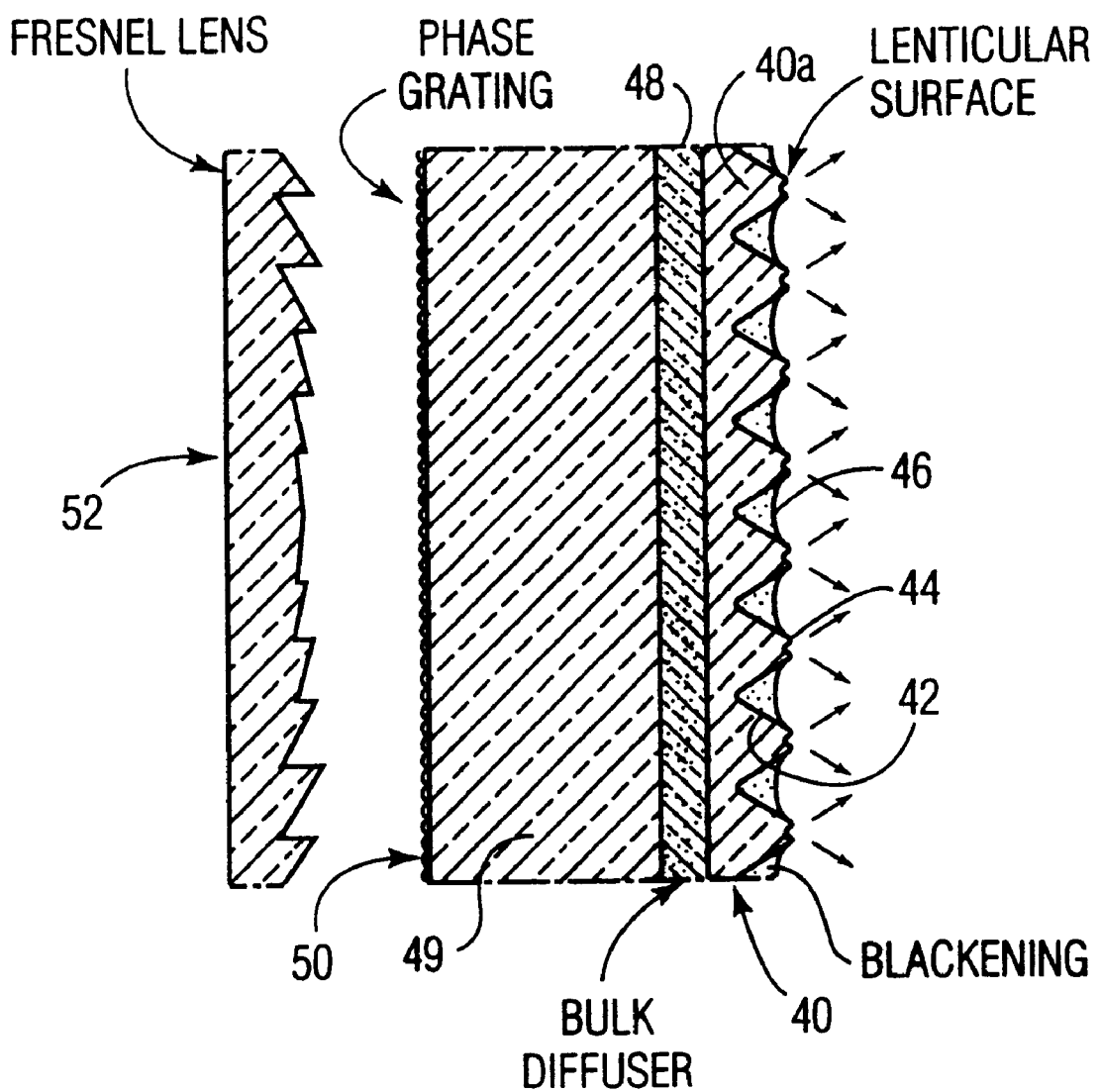
FIG. 4 is a longitudinal section view of a two piece rear projection screen of the invention, having a front piece with a front lenticular surface and a rear diffraction grating surface, and a rear piece having a front Fresnel lens surface.

FIG. 4 shows the preferred embodiment of this invention, a rear projection screen having a front piece or substrate with a front lenticular lens array 40, a bulk diffusing region 48 and a rear surface defining a diffraction grating 50. The front surface is defined by individual mutually parallel lenticular elements or lenticules 40a, each having sidewalls 42 and tip regions 44. As shown, a linear phase grating 50, sometimes referred to as a micro-lenticular or micro lens array, and a bulk diffuser 48 are separated by a clear region 49. The bulk diffuser 48 may also extend into the lenticular region 40 as far as the tip region. The thickness of the clear region or non-diffusing region 49 is typically about 3 mm.

Figure 9:
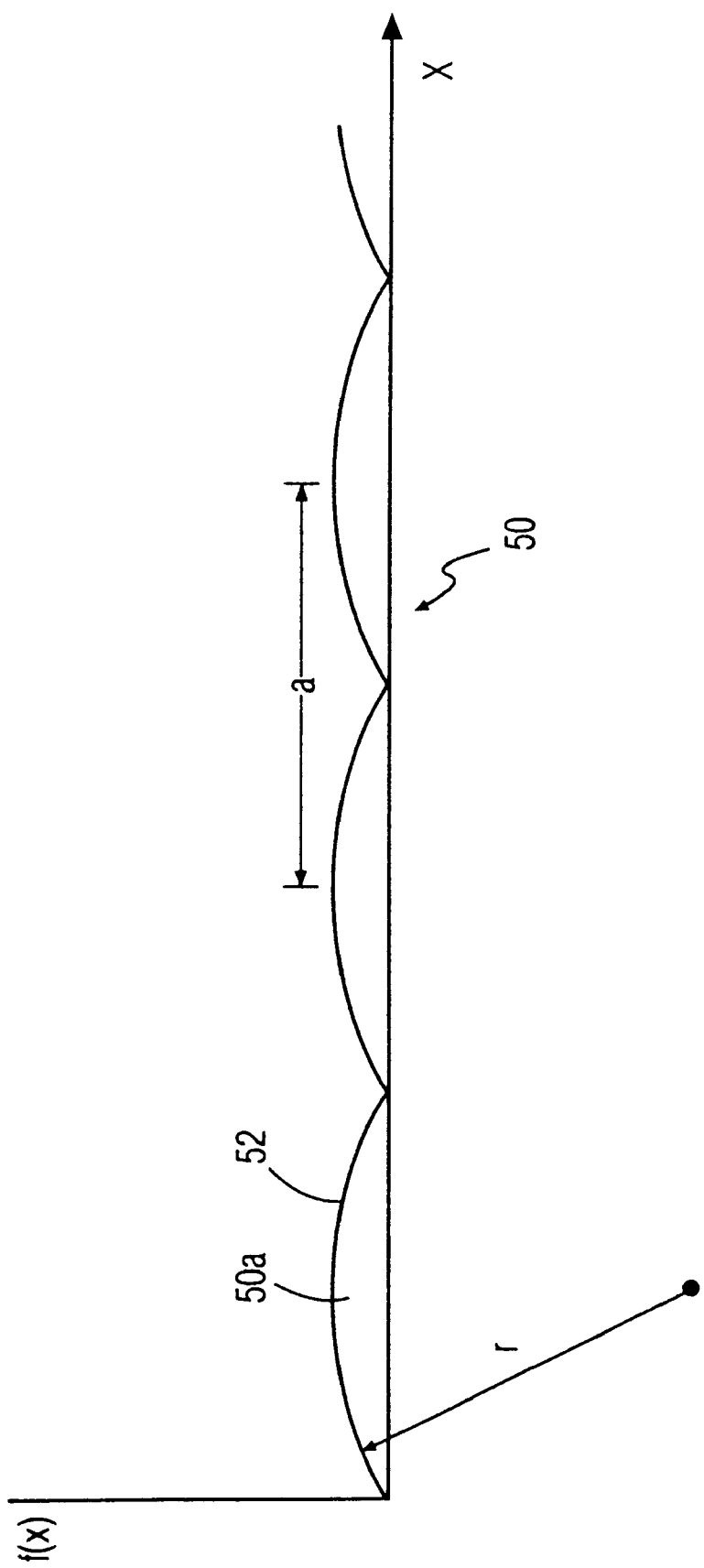
FIG. 9 is an enlarged portion of the diffraction grating surface of FIG. 4, showing the surface contour of the gratings.

FIG. 9 shows an enlarged portion of the phase grating 50, in which the individual mutually parallel gratings 50a have a cylindrical surface 52, defined by a radius r and a pitch a. The thickness of the substrate and the grating parameters are designed to provide just enough spread of the light to reduce speckle while maintaining high resolution. The phase grating typically has a pitch a of about 40 microns and a radius r of about 100 microns. Such a phase grating diffracts the incoming light into the horizontal direction with a spread typically less than ±2□. Therefore high gain is maintained.

In general, the thickness of the non-diffusing region should be between about 1 and 5 mm, preferably about 3 mm.

The thickness of the bulk diffusion region should preferably be kept below 1 mm, e.g., 0.25–0.75 mm, for high resolution, but could be increased to 2 mm for lower resolution applications, resulting in further reductions in speckle.

A rear piece 52 defines a Fresnel lens, the purpose of which is to image the exit pupil of the projector to the viewing plane.

Figure 10:
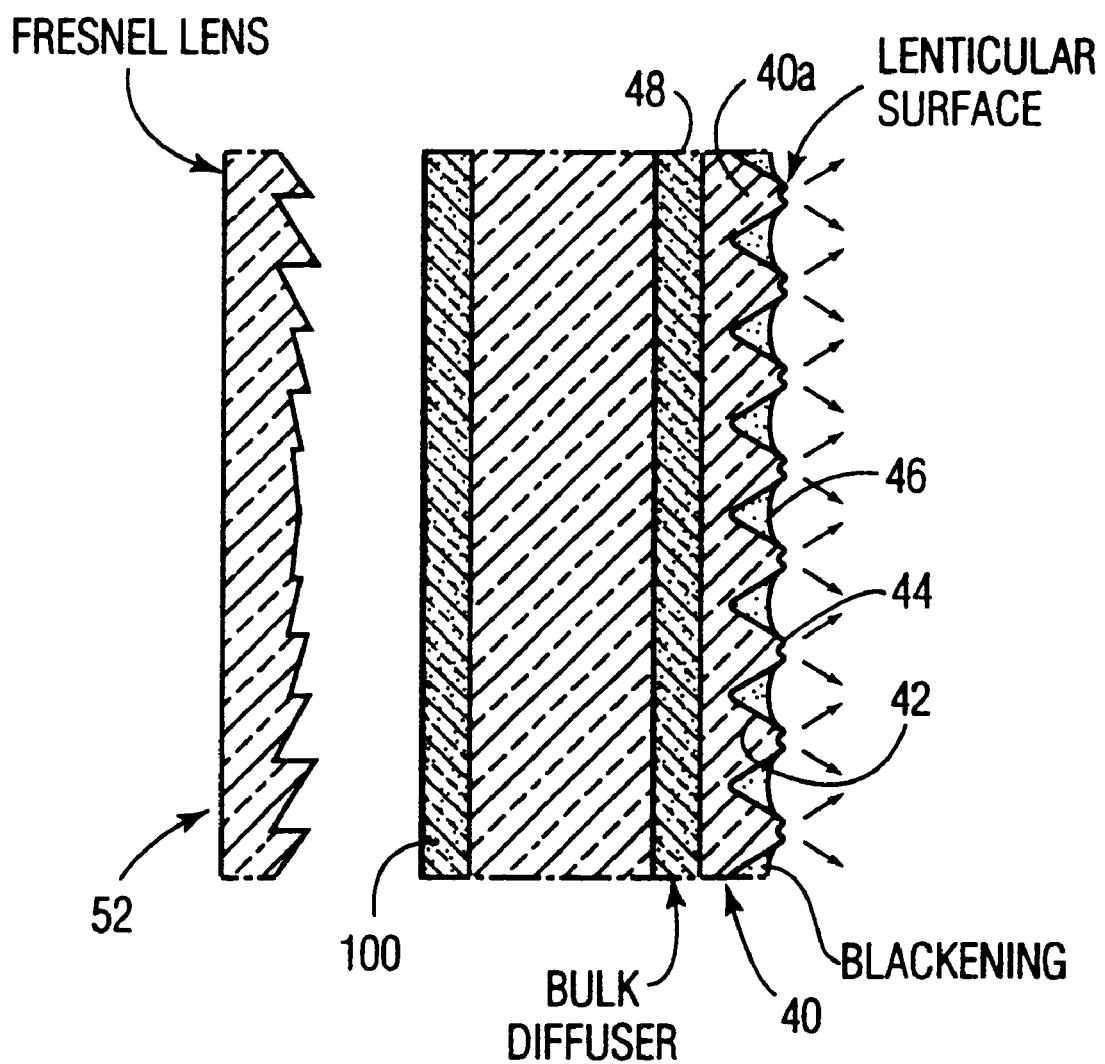
FIG. 10 is a longitudinal section view of another embodiment of a two piece rear projection screen of the invention, in which the diffraction grating has been replaced by a bulk diffusion region.

Another embodiment of the invention is shown in FIG. 10, in which phase grating 50 has been replaced by a second bulk diffusion region 100. All other features are similar to those shown in FIG. 4, and the same reference numerals have been used to indicate these features in FIG. 10. The bulk diffuser and substrate thicknesses should be designed to reduce the visibility of speckle while maintaining good resolution and high gain.

Reductions in speckle obtained using the above described embodiments of the invention were measured using a broad band light source to illuminate screen samples so that the angular extent of the illumination beam matched that of a typical light valve projector, i.e., about ±0.5. The illumination intensity was adjusted so that the DC-components of the intensity patterns were constant from sample to sample. The speckle pattern was grabbed and digitized using an 8-bit black-and-white CCD camera, and a PC equipped with an image processing board. Line scans were used to evaluate speckle reduction. Table 1 show the screen characteristics of each of three samples, the phase grating embodiment shown in FIG. 4, the double diffuser embodiment shown in FIG. 10, and the prior art TIR screen shown in FIG. 3.

TABLE I

Figure 5:
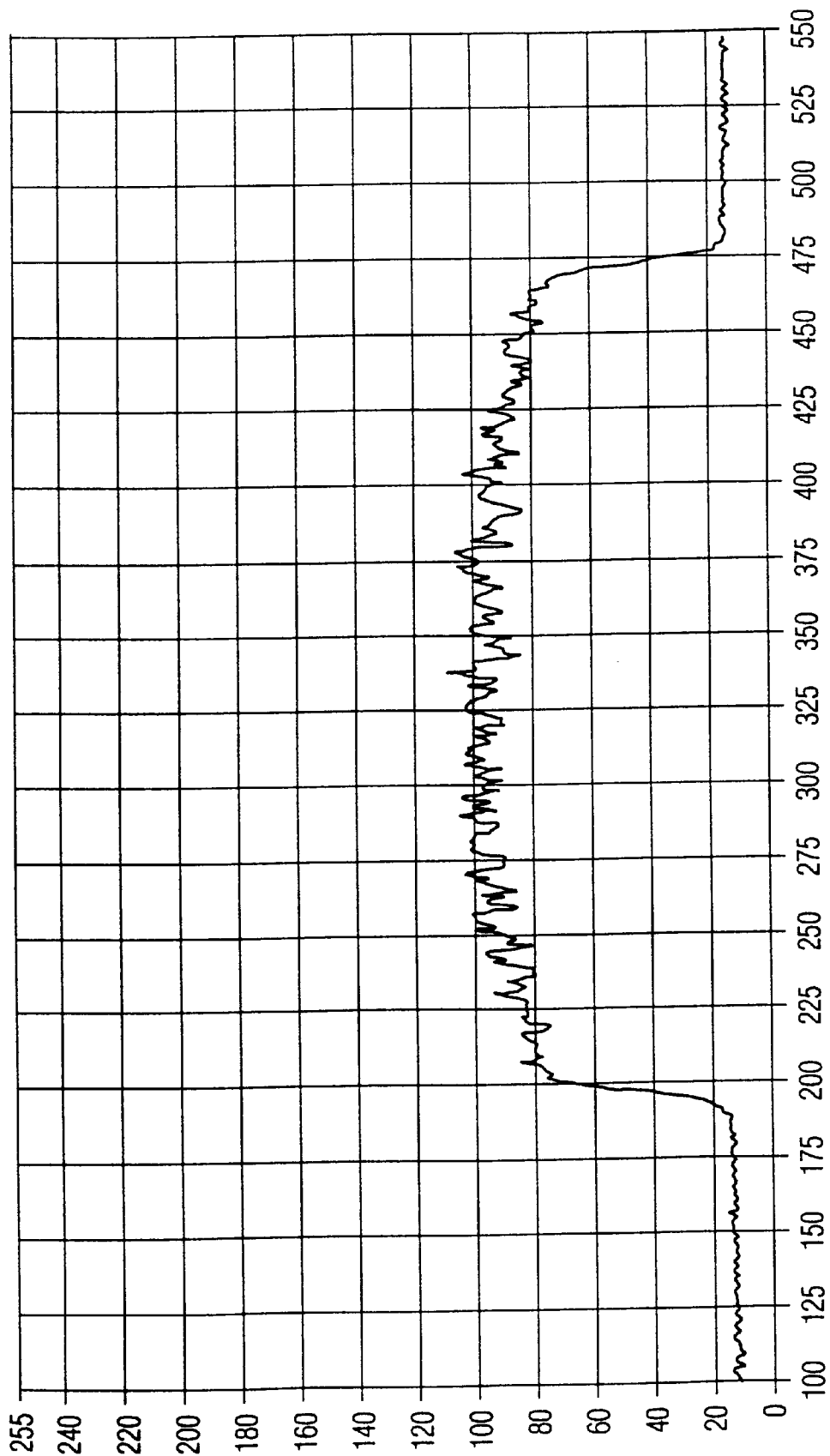
FIGS. 5 through 7 are graphical representations of line scans of the luminance outputs depicting speckle of three screens, each having a different screen configuration.
Figure 6:
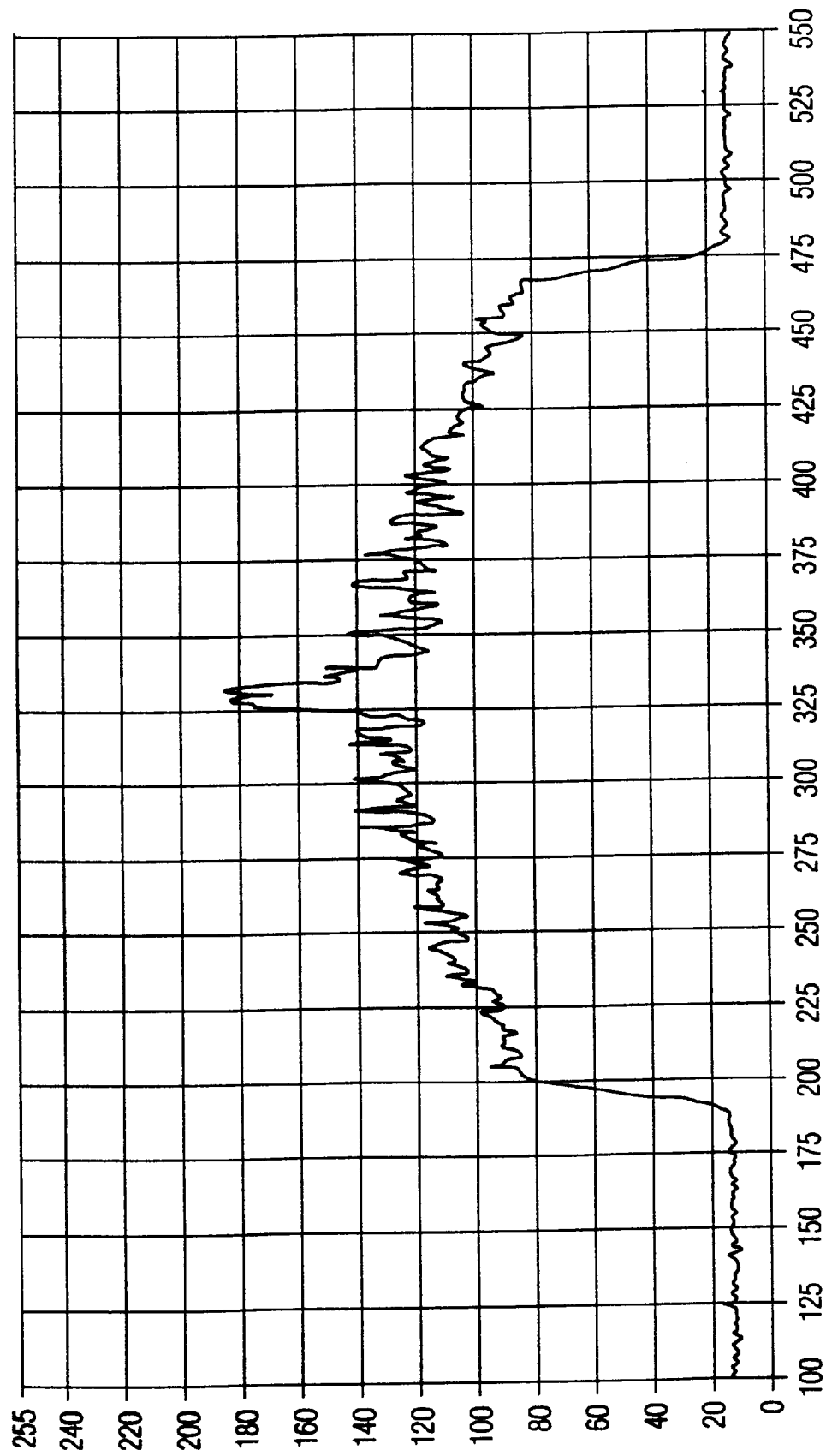
Figure 7:
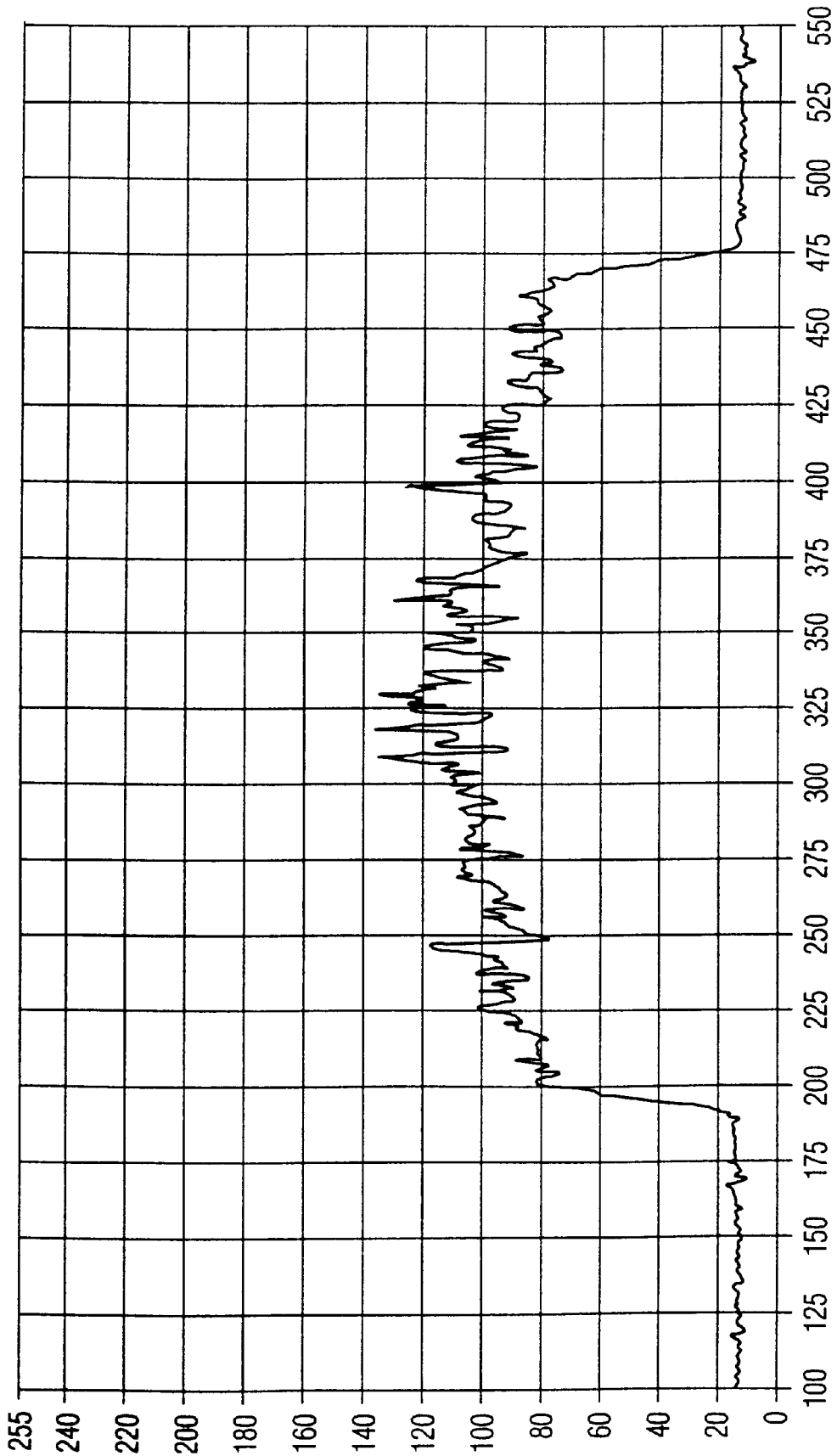

| REAR LAYER | FRONT LAYER | SEPARATION THICKNESS | HALF ANGLE | FIGURE NUMBER |
|---|---|---|---|---|
| Phase Grating | 1.5 mm bulk diffuser | 3 mm | ±8° | FIG. 5 |
| 0.75 mm bulk diffuser | 0.75 mm bulk diffuser | 3 mm | ±6° | FIG. 6 |
| none | 0.75 mm bulk diffuser | none | ±8° | FIG. 7 |

Figure 1:
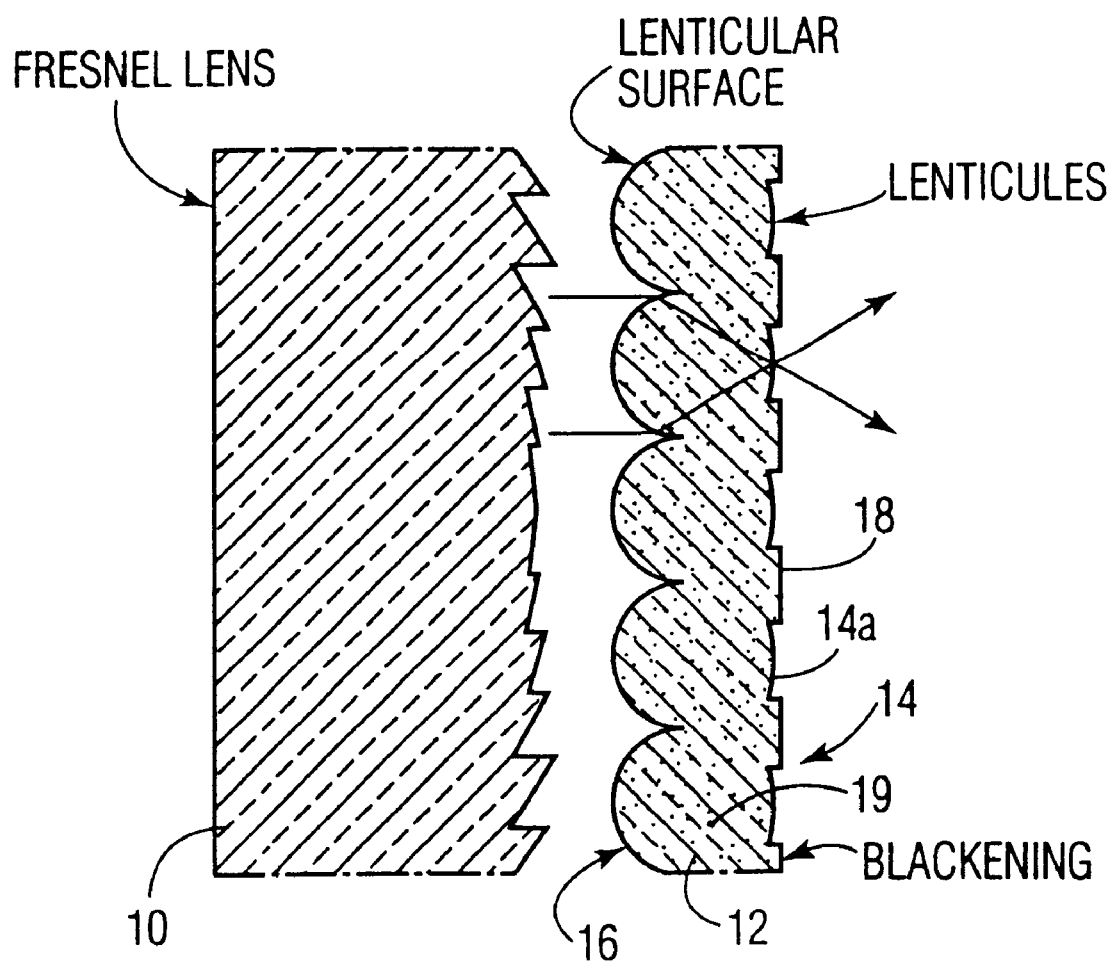
FIG. 1 is a longitudinal section view of a two piece double lenticular rear projection screen of the prior art, having a front piece with front and rear lenticular surfaces, and a rear piece with a front Fresnel lens surface.
Figure 2:
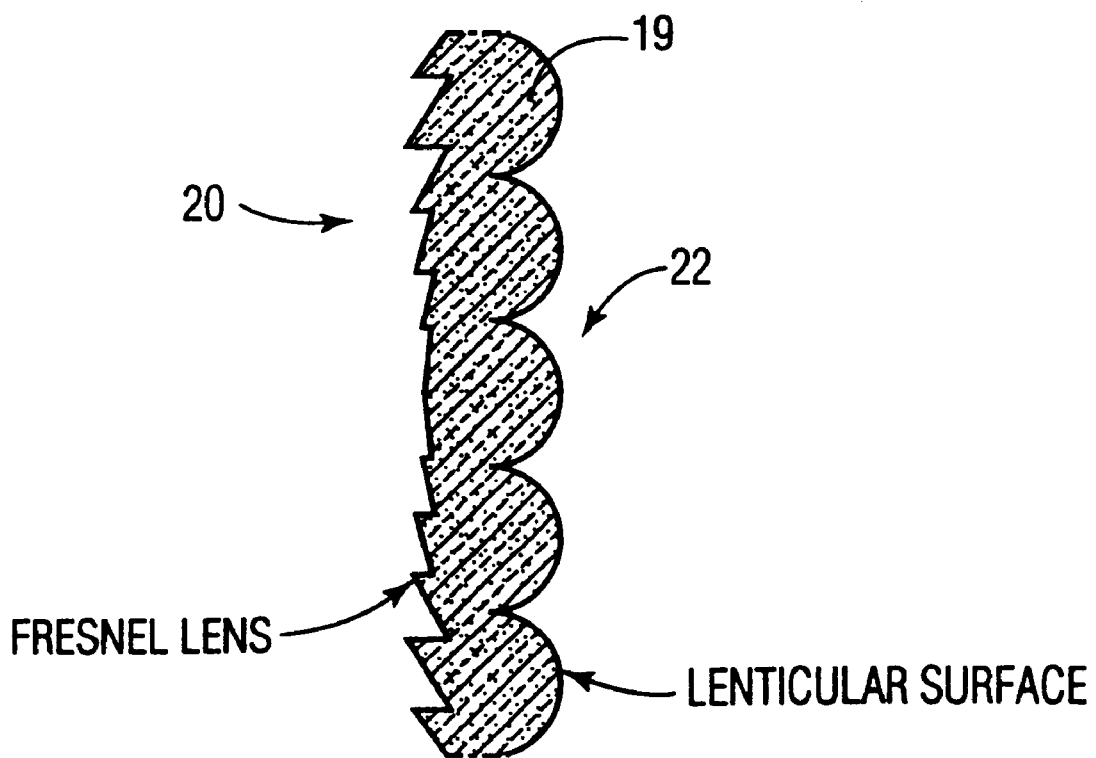
FIG. 2 is a longitudinal section view of one piece rear projection screen of the prior art, having a front lenticular surface and a rear Fresnel lens surface.
Figure 3:
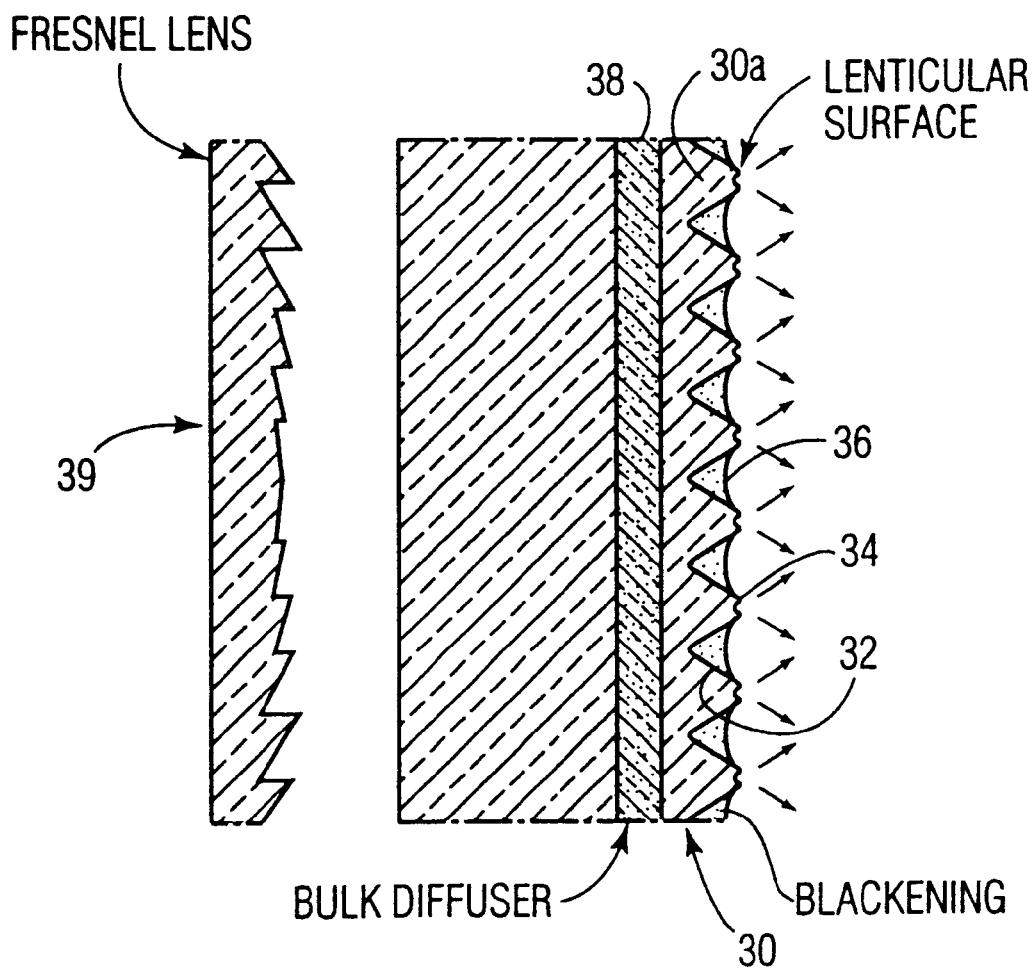
FIG. 3 is a longitudinal section view of a two piece rear projection screen of the prior art, having a front piece with a front lenticular surface, and a rear piece having a front Fresnel lens surface.

FIGS. 5, 6 and 7 show line scans for each of these samples. As may be seen, FIG. 7 corresponding to the prior art screen of FIG. 3, shows an amplitude variation in relative intensity of luminance across the screen of up to about 40; FIG. 6 corresponding to the screen of FIG. 10, shows a significant reduction in this amplitude variation to a maximum of about 30 (the peak in the center of the screen represents a specular component caused by weaker than normal diffusion of the rear bulk diffuser). FIG. 5 corresponding the diffraction grating embodiment of FIG. 4, shows further improvement, as evidenced by a reduction in amplitude variation to less than 20.

Analysis and design of the phase grating requires Fourier diffraction theory. The surface of the grating can be described as $$comb\left(\frac{x}{a}\right) \otimes f(x) \qquad \text{(Eq. 1)}$$

where $$comb\left(\frac{x}{a}\right)$$

is defined as $\Sigma\delta(x-a)$ and a is equal to the pitch of the elements. $f(x)$ can be approximated by the $1^{st}$ order equation of the sag of a cylindrical surface (see FIG. 8):

$$f(x) = \frac{x^2}{2r} \qquad \text{(Eq. 2)}$$

where r is the radius of the element.

This surface will diffract incident light into orders at angles, $\theta_m$, given by the grating equation referenced by E. Hecht and A. Zajac, OPTICS, Addison-Wesley Publishing Company, P. 357, (1979), $$\alpha(\sin(\theta_m)) = m\lambda \quad m=1,2,3\ldots \quad \text{(Eq.3)}$$

where $\lambda$ is the wavelength of light.

To calculate the intensity of each diffraction order, far field diffraction theory is applied. It can be shown that in the far field, the amplitude function is proportional to the Fourier transform of $A(x,y)$ where $A(x,y)$ is the amplitude function of the transmitted beam and is given by $$A(x,y) = e^{\frac{2\pi i OPD}{\lambda}} \quad \text{(Eq. 4)}$$

where OPD is the optical path introduced by an element $$OPD = (n-1)f(x) = \frac{x^2(n-1)}{2r} \quad \text{(Eq. 5)}$$

Therefore, $$A(x,y) = e^{\frac{\pi i x^2 (n-1)}{r\lambda}} = e^{i\varphi x^2} \quad \text{(Eq. 6)}$$

where $$\varphi = \frac{\pi(n-1)}{r\lambda} \quad \text{(Eq. 7)}$$

The normalized intensity pattern is given by $$I(u,v) = \bar{A}(u,v)\bar{A}^*(u,v) \text{ where } \bar{A} = FT(A(x,y)) \quad \text{(Eq.8)}$$

MATLAB for Windows, a commercially available mathematical analysis program from The Mathwork, Inc., available was used to perform a FFT of the transmitted wavefront, $A(x,y)$, and to calculate the normalized intensity pattern, $I(u,v)$.

Figure 8:
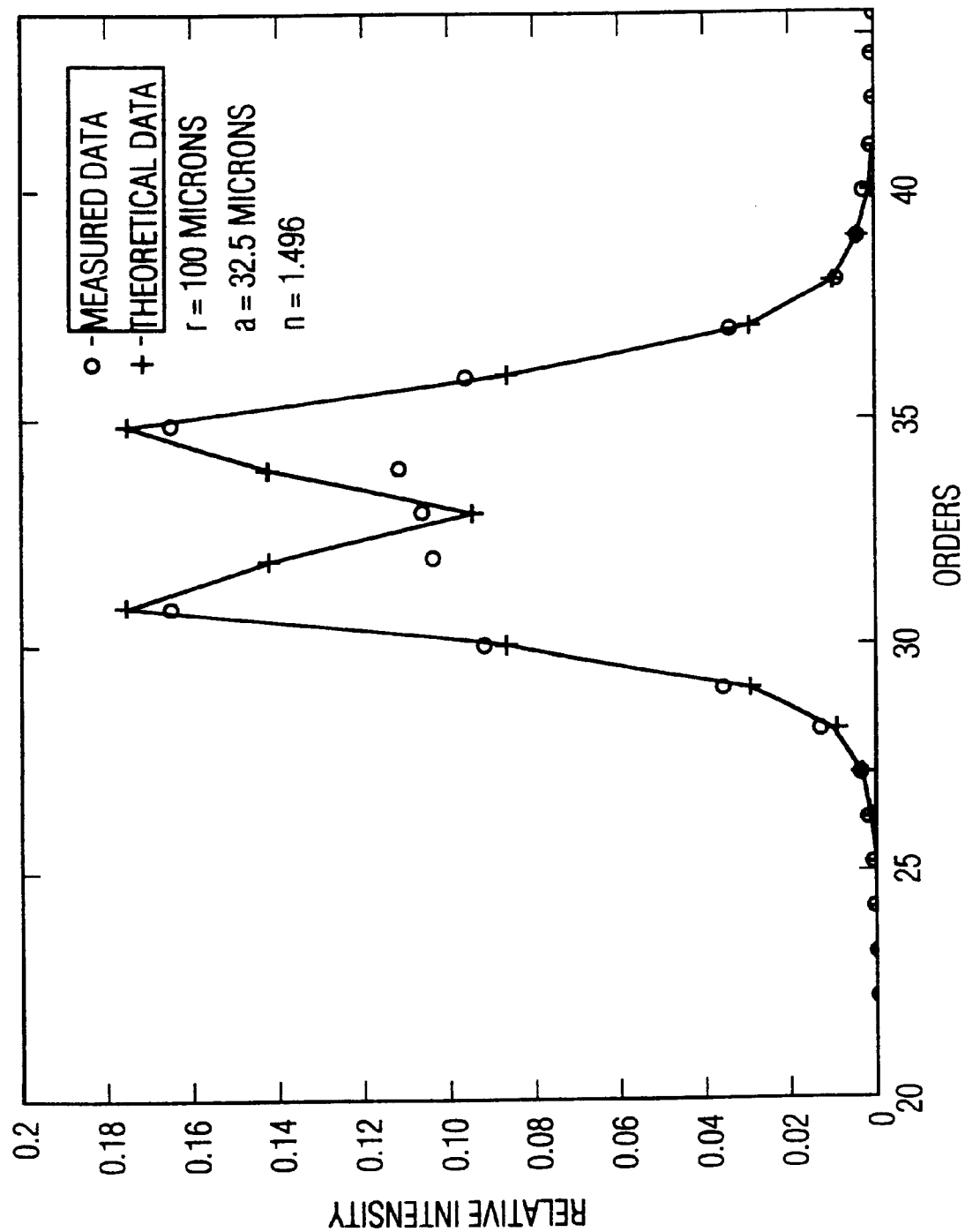
FIG. 8 is a graphical representation of a line scan depicting the angular distribution of the luminance output of a grating suitable for use in the invention, compared to a computation of expected luminance output for such a grating using Fourier diffraction theory.

For $r=100$ microns, $a=32.5$ microns, and $\lambda=0.6328$, the calculated pattern is shown as the solid line in FIG. 8. Experimental data points were obtained with a goniometer and plotted on the same figure as the small circles.

As may be seen, the very high correlation between the calculated and experimental intensity pattern confirms that the grating is acting as a diffraction element.

Figure 11:
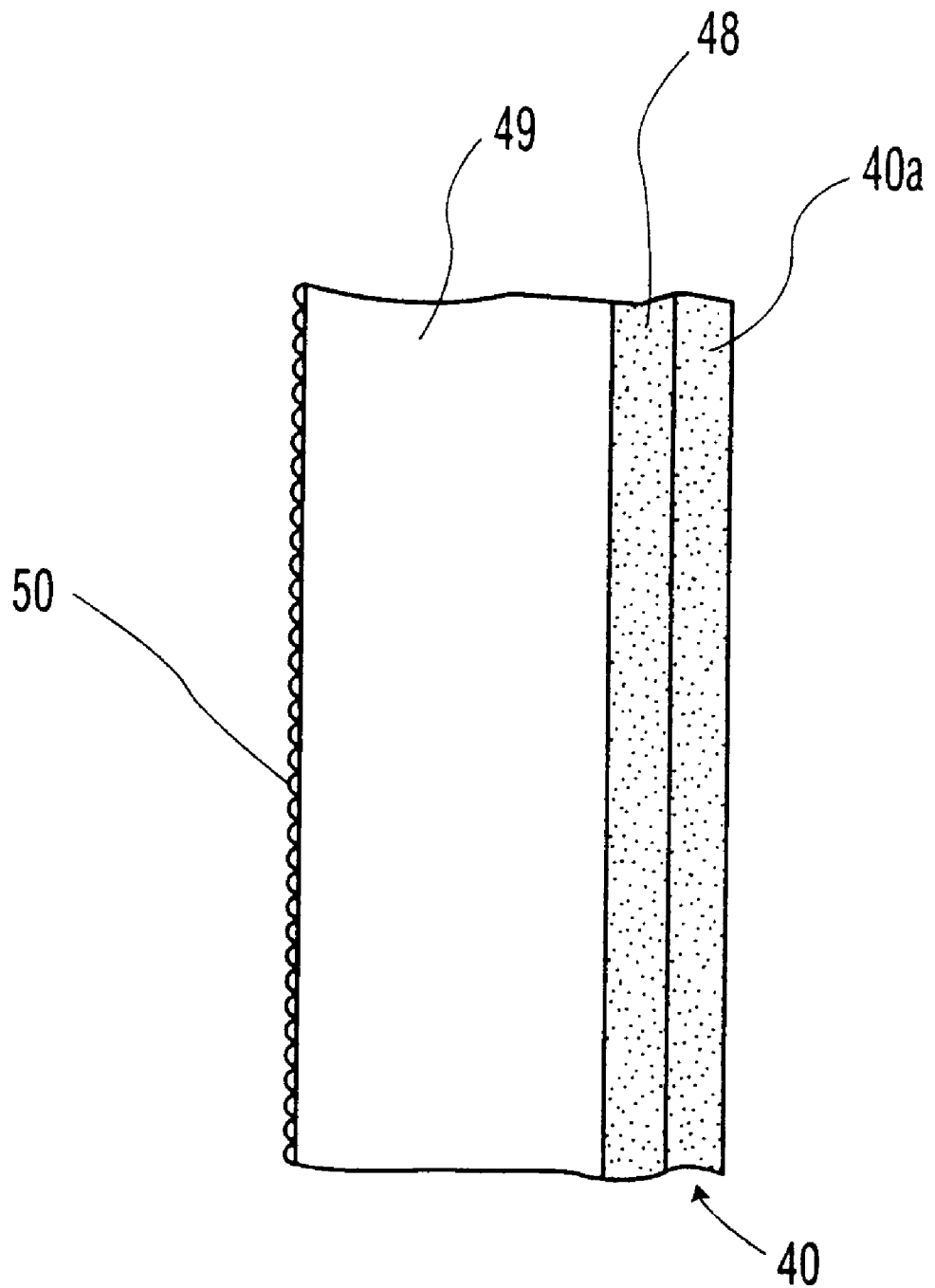
FIG. 11 is a longitudinal section view of another embodiment of the front piece of a two piece rear projection screen of the invention, showing the lenticules of the front surface oriented orthogonal to the elements of the phase grating, and the diffusion regions extending into the tips of the lenticules.

FIG. 11 is a longitudinal section view of another embodiment of the front piece of a two piece rear projection screen of the invention, showing the lenticules 40 of the front surface oriented orthogonal to the elements of the phase grating 50, and the diffusion region 48 extending into the tips of the lenticules.

Figure 12:
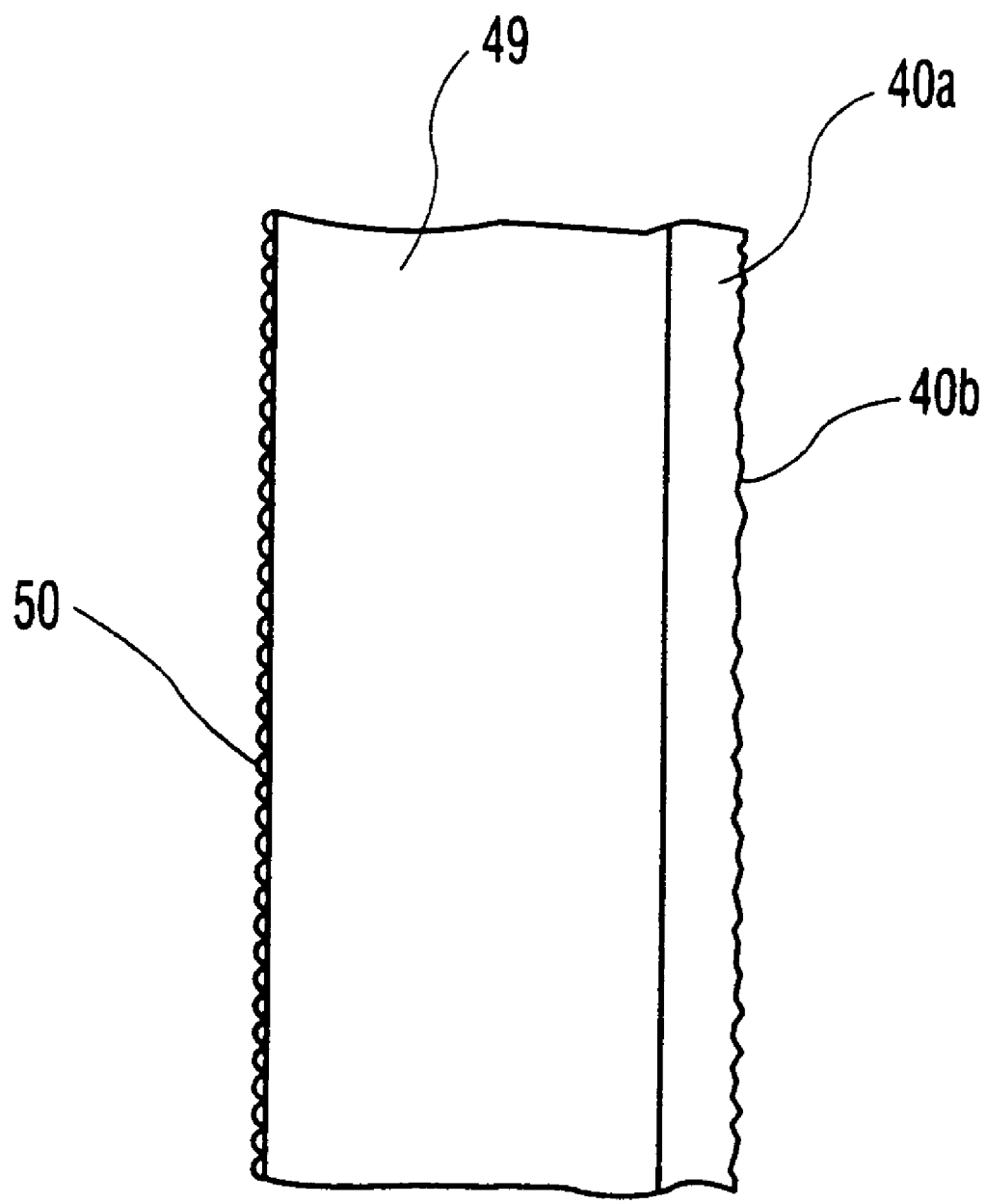
FIG. 12 is a longitudinal section view of another embodiment of the front piece of a two piece rear projection screen of the invention, showing a roughened lenticules front surface.

FIG. 12 is a longitudinal section view of another embodiment of the front piece of a two piece rear projection screen of the invention, which is similar to the embodiment of FIG. 11, except that the diffusion region 48 has been replaced by a roughened front surface 40b of the lenticular elements 40a.

The invention has necessarily been described in terms of a limited number of embodiments. Other embodiments will be readily apparent to those skilled in the art, and are intended to be encompassed within the scope of the appended claims. For example, the linear phase grating elements, while shown oriented parallel to the front lenticular elements in the embodiment of FIG. 4, could alternatively be oriented orthogonally to the lenticular elements. In addition, the rear diffusion region shown in the embodiment of FIG. 10 could be replaced by surface diffusion, i.e., a roughening of the rear surface of the substrate, or by holographic diffusion, which may be either surface or bulk diffusion.

What is claimed is:

1. A Rear projection screen comprising a front surface, a rear surface and first diffusion means for diffusing light into an audience space, characterized in that the screen comprises second diffusion means located behind the first diffusion means and a non-diffusion region between the first and the second diffusion means, wherein the second diffusion means comprises a bulk diffusion region, said bulk diffusion region and non-diffusion region being configured to reduce speckle without substantially reducing resolution.

2. Rear projection screen as claimed in claim 1, characterized in that the front surface is defined by an array of mutually parallel lenticules for spreading light into the audience space.

3. Rear projection screen as claimed in claim 1, characterized in that the second diffusion means consists of holographic diffuser.

4. A rear projection screen comprising a front surface, a rear surface and diffusion means for diffusing light into an audience space, characterized in that the rear surface comprises a phase grating and that the screen comprises a non-diffusing region between the diffusion means and the phase grating.

5. Rear projection screen as claimed in claim 4, characterized in that the front surface is defined by an array of mutually parallel lenticules for spreading light into the audience space.

6. Rear projection screen as claimed in claim 4 or 5, characterized in that the diffusion means comprises a bulk diffusion region between the front surface and the non-diffusion region.

7. Rear projection screen of claim 6, characterized in that the bulk diffusion region extends into the tip regions of the lenticules.

8. Rear projection screen as claimed in claim 6, characterized in that the bulk diffusion region comprises colloidal particles suspended in the screen.

9. Rear projection screen as claimed in claim 8, characterized in that the colloidal particles are less than about 40 microns in size.

10. Rear projection screen as claimed in claim 6, characterized in that the bulk diffusion region is about 0.25 to 3 mm.

11. Rear projection screen as claimed in claim 5, characterized in that the diffusion means comprises a roughening of the front lenticular surface.

12. Rear projection screen as claimed in claim 5, characterized in that the lenticules have tip regions and steep sides for total internal reflection.

13. Rear projection screen as claimed in claim 5, characterized in that a light absorbing material is present between the lenticules of the front lenticular surface.

14. Rear projection screen as claimed in claim 4, characterized in that the non-diffusion region is about 1 to 5 mm.

15. Rear projection screen as claimed in claim 14, characterized in that the non-diffusion region is about 3 mm.

16. Rear projection screen as claimed in claim 4, characterized in that the phase grating comprises an array of mutually parallel linear grating elements.

17. Rear projection screen as claimed in claim 16, characterized in that the phase grating has a pitch of from about 15 to 60 microns, where the pitch is the distance between the centers of adjacent elements of the phase grating.

18. Rear projection screen as claimed in claim 16, characterized in that the elements of the phase grating have a curved surface.

19. Rear projection screen as claimed in claim 18, characterized in that the elements have a cylindrical surface having a radius of curvature of from 50 to 300 microns.

20. Rear projection screen as claimed in one of the claims 16 to 19, characterized in that the phase grating has a pitch of about 40 micros and a radius of curvature of about 100 microns.

21. Rear projection screen as claimed in one of the claims 16 to 19, characterized in that the elements of the phase grating are oriented orthogonal to the front lenticular elements.

22. Rear projection screen as claimed in claim 16, characterized in that the elements of the phase grating are oriented parallel to the lenticular elements.

23. Rear projection screen as claimed in claim 4, characterized in that a Fresnel lens is located behind the rear surface.

* * * * *